United States Patent Office 3,600,205
Patented Aug. 17, 1971

3,600,205
BORIC OXIDE-FREE GLASS FIBERS AND COMPOSITIONS FOR MAKING THEM
Jean Claude Breton, Chambery, France, assignor to Compagnie de Saint-Gobain, Neuilly-sur-Seine, France
No Drawing. Filed July 7, 1967, Ser. No. 651,693
Claims priority, application France, July 11, 1966, 68,950
Int. Cl. C03c *13/00*
U.S. Cl. 106—50                                    10 Claims

ABSTRACT OF THE DISCLOSURE

Good quality glass fibers are produced with satisfactory properties inter alia for making mats, insulation and textiles, and for reinforcing plastics, at fibering temperatures much lower than those used with the present, standard fibering glass, at lower cost, and in some cases at temperatures which permit the substitution of refractory metals other than platinum in the construction of fibering apparatus.

---

This invention relates to the manufacture of glass fibers, to the compositions used in the manufacture, to the compositions of the fibers, and to novel articles of the types in which glass fibers are used.

The manufacture of glass fibers is well known but the number of glasses which can be used for it is extremely limited, to the extent that the standard E glass is almost unique. E glass contains $B_2O_3$, is costly, high melting to the point of requiring platinum apparatus be used in fibering, and free of alkali oxides. The search for less costly glasses for fibering has been long and unsuccessful.

It is an object of this invention to provide new glass fibers from compositions of lower cost, lower melting point and lower fibering temperature, free of boric oxide, which may contain alkali metal oxides, which will provide fibers satisfactory for use in fabrics, plastics, insulation, mats and the like, and will have excellent resistance to attack by the agents usually encountered in each such use. It is another object to provide glasses which can be fibered in short lengths or in continuous lengths with equal satisfaction. Despite the absence of boric compounds, which has been necessary in practice in prior fibering glasses, the new glasses have good fusibility, good resistance to attack, and low cost.

The objects of the invention are accomplished, generally speaking, by glass fibers having the composition $SiO_2$ 57 to 62% by weight (inclusive); CaO 8 to 12%, preferably 9 to 10%; $Al_2O_3$ 4.5 to 8.5%, preferably 4.5 to 6%; MgO 2 to 5%, preferably 4 to 5%; $Na_2O$ 14.5 to 16%, preferably 14.80 to 15%; BaO 0 to 4.5%, preferably 1.5 to 4.5%; ZnO 1 to 4%, preferably 1.3 to 3%, $ZrO_2$ 0 to 3%, preferably 1.4 to 3%; $Fe_2O_3$ 0.3 to 1.5% preferably 0.5 to 1%; $F_2$ 0 to 1.5%, preferably 0 to 1%; $K_2O$ 0.10 to 0.50%, preferably 0.15 to 0.35%; and in which the ratio $$1 \leq \frac{MgO + CaO + BaO + ZnO}{Na_2O} \leq 1.4$$

A typical composition for the manufacture of such a glass is sand 44.690% by weight, (inclusive); dolomite 7.935%; limestone 8.895%, fluorspar 0.861%; sodium carbonate 20.830%, barium carbonate 1.567%; zirconiferous sand 1.830%; zinc oxide 1.218%; kaolin 11.696%; and iron oxide 0.478%.

The temperature suitable for the melting of this glass batch is about 1450° C. With the bushings used to make the fibers of composition 2, we used this formula to make the glass, and an attenuating speed of 20 meters per second and a temperature of the attenuation cone of 1150° C. while the fibers were being spun from the glass.

The filaments had an average diameter of 9 microns. It is to be noted that the spinning temperatures used with industrial bushings are identical with those used in the laboratory.

In considering the formulas it is to be remembered that, if a minimum of one ingredient be used, for instance silica, the content of the other ingredients will be raised within their permissible limits, until the total approximates 100%.

The following are three glass compositions which fall within the foregoing requirements:

| Constituent: | Percent by weight |  |  |
|---|---|---|---|
| | 1 | 2 | 3 |
| $SiO_2$ | 61.40 | 61.30 | 57.90 |
| CaO | 8.00 | 9.90 | 8.90 |
| $Al_2O_3$ | 6.00 | 5.90 | 5.95 |
| MgO | 4.00 | 2.10 | 4.30 |
| $Na_2O$ | 15.00 | 15.00 | 14.80 |
| $K_2O$ | 0.20 | 0.25 | 0.20 |
| BaO | 1.70 | 1.65 | 4.10 |
| ZnO | 1.45 | 1.55 | 1.60 |
| $ZrO_2$ | 1.45 | 1.45 | 1.40 |
| $Fe_2O_3$ | 0.5 | 0.5 | 0.5 |
| F | 0.50 | 0.50 | 0.50 |
| $TiO_2$ | 0.06 | 0.06 | 0.05 |
| $SO_3$ | $\leq$0.05 | $\leq$0.05 | $\leq$0.05 |
| Deduction of oxygen corresponding to fluorine | 0.21 | 0.21 | 0.21 |

These glasses were tested by standard methods to determine R (mechanical resistance of original filament to drawing), E (Young's Modulus in hectobars), T (fibering temperature in °C.), $DGG_P$ (attackability by $H_2O$ in mg.), and $DGG_A$ (alkalinity of the residues as percent of $Na_2O$).

All glasses having the general compositions given above have values for R superior to 250, for E superior to 5500, T circa 1030–1230° C., and preferably circa 1050–1200° C., a liquidus below 1060° C. for a mean diameter circa 6.6–9 microns, a $DGG_P$ circa 5.3–10.4 and preferably 5.5–10.1 and a $DGG_A$ circa 1.8–5.9 preferably circa 1.9–5.0.

We give hereafter the results of tests concerning the three glass compositions 1, 2, 3.

| Glass Composition | R | E | T | Liquidus temp., °C. | Average diameter in m$\mu$ | DGG P | DGG A |
|---|---|---|---|---|---|---|---|
| 1 | 281 | 5,800 | 1,150 | 1,020 | 6.6 | 7.7 | 3.04 |
| 2 | 278 | 5,900 | 1,150 | 1,030 | 9.0 | 8.9 | 3.16 |
| 3 | 290 | 5,800 | 1,125 | 1,040 | 9.0 | 6.1 | 2.98 |

The viscosity of the same three glasses was also measured at different temperatures, revealing the following:

| Temp., in °C. | Glass 1 | | Glass 2 | | Glass 3 | |
|---|---|---|---|---|---|---|
| | Log $\eta$ | $\eta$ | Log $\eta$ | $\eta$ | Log $\eta$ | $\eta$ |
| 850 | 5.44 | 277380 | 5.40 | 248910 | 5.24 | 174710 |
| 900 | 4.81 | 65027 | 4.77 | 58890 | 4.59 | 38810 |
| 1,000 | 3.90 | 7875 | 3.86 | 7187 | 3.68 | 4760 |
| 1,100 | 3.21 | 1640 | 3.18 | 1510 | 3.00 | 1000 |
| 1,200 | 2.67 | 470 | 2.64 | 435 | 2.47 | 290 |
| 1,300 | 2.22 | 170 | 2.18 | 153 | 2.02 | 105 |

From the viscosity one would expect excellent fibering characteristics around 1130° C., and they are indeed obtained, which is about one hundred degrees below the E glass fibering temperature of 1230° C. To obtain such low fibering temperatures while obtaining the desirable properties necessary to good glass fibers is a multiple advantage.

The glasses may be fibered successfuly by any known fibering means, by centrifugal spinning, by disruption of molten drops on a spinning disk, by hot gaseous blast, by partitioning molten glass and drawing it out into strands by steam or hot air, and by rotary clyinders or drums.

Fibering temperatures for these glasses range from 1030 to 1230° C., which is very low compared to the glasses now available for fibering to comparable products. This results in a major reduction in heating costs and reduces the size of and investment in melting and fibering apparatus. It also permits in some cases special, high refractory steels to be used in fibering apparatus in place of the usual platinum with similar length of life.

These glasses can be used for the manufacture of mineral textile fibers, for the production of continuous fibers susceptible of being transformed into threads used afterwards for the manufacture of fabrics, or to be used as reinforcing elements for organic and inorganic material. The diameters of these fibers can vary according to their utilization between about 3 and about 14 microns. These glasses can be used with platinum bushings fed directly with molten glass or by cold glass in the form of cullet or marbles. The fibers can be attenuated by any of the known processes.

The values R and E will vary somewhat with the operative means employed in fibering. Spinning conditions depend on the liquidus temperature. The traction used to measure R and E was 4 mm. per minute.

In making the tests for R, and Young's modulus E, standard techniques and a standard dynamometer were used. To determine fibering temperature T an optical pyrometer was employed with a standard technique. Attackability by water was measured by the method of Deutsche Glastechnische Gesellschaft.

As many apparently widely different embodiments of the present invention may be made without departing from the spirit and scope thereof, it is to be understood that the invention is not limited to the specific embodiments.

What is claimed is:

1. Glass fiber-forming compositions, free of boric oxide and having fibering temperatures from about 1030° C. to 1230° C., and consisting essentially of in weight percent

| | Percent (inclusive) |
|---|---|
| $SiO_2$ | 57–62 |
| CaO | 8–12 |
| $Al_2O_3$ | 4.5–8.5 |
| MgO | 2–5 |
| $Na_2O$ | 14.5–16 |
| BaO | 0–4.5 |
| ZnO | 1–4 |
| $ZrO_2$ | 0–3 |
| $Fe_2O_3$ | 0.3–1.5 |
| F | 0–1.5 |
| $K_2O$ | 0.1–0.5 | in which the ratio of the sum of MgO, CaO, BaO and ZnO to $Na_2O$ is greater than one and less than 1.4.

2. Glass fiber-forming compositions according to claim 1 consisting essentially of in weight percent

| | Percent |
|---|---|
| $SiO_2$ | 57–62 |
| CaO | 9–10 |
| $Al_2O_3$ | 4.5–6 |
| MgO | 4–5 |
| $Na_2O$ | 14.8–15 |
| BaO | 1.5–4.5 |
| ZnO | 1.3–3 |
| $ZrO_2$ | 1.4–3 |
| $Fe_2O_3$ | 0.5–1 |
| F | 0–1 |
| $K_2O$ | 0.15–0.35 | in which the ratio of the sum of MgO, CaO, BaO and ZnO to $Na_2O$ is greater than 1.0 and less than 1.4.

3. Glass compositions according to claim 1 consisting of in weight percent: $SiO_2$ 61.40; CaO 8.00; $Al_2O_3$ 6.00; MgO 4.00; $Na_2O$ 15.00; $K_2O$ 0.20; BaO 1.70; ZnO 1.45; $ZrO_2$ 1.45; $Fe_2O_3$ 0.5; F 0.50; $TiO_2$ 0.06; and $SO_3$ less than 0.05.

4. Glass compositions according to claim 1 consisting of in weight percent: $SiO_2$ 61.30; CaO 9.90; $Al_2O_3$ 5.90; MgO 2.10; $Na_2O$ 15.00; $K_2O$ 0.25; BaO 1.65; ZnO 1.55; $ZrO_2$ 1.45; $Fe_2O_3$ 0.5; F 0.50; $TiO_2$ 0.06; and $SO_3$ less than 0.05.

5. Glass compositions according to claim 1 consisting of in weight percent: $SiO_2$ 57.90; CaO 8.90; $Al_2O_3$ 5.95; MgO 4.30; $Na_2O$ 14.80; $K_2O$ 0.20; BaO 4.10; ZnO 1.60; $ZrO_2$ 1.40; $Fe_2O_3$ 0.5; F 0.50; $TiO_2$ 0.05; and $SO_3$ less than 0.05.

6. Glass fibers having the composition of claim 1, and R superior to 250, E superior to 550, T circa 1030° C.–1230° C., liquidus inferior to 1060° C., mean diameter circa 6.6–9 microns, $DGG_P$ circa 5.3–10.4, $DGG_A$ circa 1.8–5.9.

7. Glass fibers having the composition of claim 2, and R above 250, E above 550, T circa 1050°–1200° C., liquidus below 1060° C., mean diameter circa 6.6–9 microns, $DGG_P$ circa 5.5–10.1, $DGG_A$ circa 1.9–5.0.

8. Glass fibers having the composition of claim 3, and R circa 281, E circa 5800, T circa 1150, liquidus circa 1020, mean diameter 6.6 microns, $DGG_P$ circa 7.7, $DGG_A$ circa 3.04.

9. Glass fibers having the composition of claim 4, and R circa 278, E circa 5900, T circa 1150, liquidus circa 1030, mean diameter 9 microns, $DGG_P$ circa 8.9, $DGG_A$ circa 3.16.

10. Glass fibers having the composition of claim 5, and R circa 290, E circa 5800, T circa 1125, liquidus circa 1040, mean diameter circa 9 microns, $DGG_P$ circa 6.1, $DGG_A$ circa 2.98.

References Cited

UNITED STATES PATENTS

| | | | |
|---|---|---|---|
| 2,664,359 | 12/1953 | Dingledy | 106—50 |
| 3,294,557 | 12/1966 | Lajarte | 106—52 |
| 3,095,311 | 6/1963 | Wranau et al. | 106—50 |
| 3,294,557 | 12/1966 | Lajarte | 106—52 |
| 2,685,527 | 8/1954 | Labino | 106—50 |
| 3,464,836 | 9/1969 | Pendleton et al. | 106—50X |

FOREIGN PATENTS

| | | | |
|---|---|---|---|
| 1,322,725 | 2/1963 | France | 106—50 |

OTHER REFERENCES

Morey, G. W., The Properties of Glass, New York (Reinhold) 1954, pp. 125–126.

Volf, M. B., Technical Glasses, London (Pitman) 1961, pp. 26, 110–111.

Ceramic Industry Magazine (Zinc Oxide), Chicago (Cahnen) IU, January 1966 (86), p. 163.

HELEN M. McCARTHY, Primary Examiner

W. R. SATTERFIELD, Assistant Examiner

U.S. Cl. X.R.

65—1; 106—52